United States Patent [19]

Kugelman et al.

[11] Patent Number: 4,745,511

[45] Date of Patent: May 17, 1988

[54] MEANS FOR ARC SUPPRESSION IN RELAY CONTACTS

[75] Inventors: Michael M. Kugelman; James M. Roman, both of Akron, Ohio

[73] Assignee: The BF Goodrich Company, Akron, Ohio

[21] Appl. No.: 913,894

[22] Filed: Oct. 1, 1986

[51] Int. Cl.⁴ ................................................ H02H 7/00

[52] U.S. Cl. ........................................... 361/8; 361/13

[58] Field of Search ........................ 361/5, 7, 8, 10, 11, 361/13; 307/124, 125

[56] References Cited

U.S. PATENT DOCUMENTS

| | | | |
|---|---|---|---|
| 4,420,784 | 12/1983 | Chen et al. | 361/13 X |
| 4,438,472 | 3/1984 | Woodworth | 361/13 |

FOREIGN PATENT DOCUMENTS

| | | | |
|---|---|---|---|
| 8203732 | 2/1980 | PCT Int'l Appl. | 361/13 |
| 8601334 | 2/1986 | PCT Int'l Appl. | 361/13 |

*Primary Examiner*—A. D. Pellinen

*Assistant Examiner*—Derck S. Jennings

*Attorney, Agent, or Firm*—Woodrow W. Ban

[57] ABSTRACT

In a circuit having a electro-mechanical relay the contacts of which are subject to arcing, a shunt across the electro-mechanical relay configured to begin conducting electrical current across the electro-mechanical relay prior to closing the electro-mechanical relay contacts and to continue conducting electrical power across the electro-mechanical relay for a predetermined time after the onset of separation of electro-mechanical relay contacts pursuant to discontinuance of current flow through the elecro-mechanical relay. An optical coupler is employed to detect the current flow through the relay coil and activate a shunt device to initiate current flow around the electro-mechanical relay. The shunt device is configured to be substantially non-current load carrying while the electro-mechanical relay is closed. Utility is found in protecting relay contacts against damage due to arcing.

7 Claims, 1 Drawing Sheet

MEANS FOR ARC SUPPRESSION IN RELAY CONTACTS

FIELD OF THE INVENTION

This invention relates to electrical circuits and, more particularly, to the prevention of damage to components employed in such electrical circuits. More specifically this invention relates to means for suppressing arcing across contacts within an electro-mechanical relay during opening and closing of the electro-mechanical relay to establish or discontinue electrical current flow within the circuit employing the relay.

BACKGROUND OF THE INVENTION

The use of electro-mechanical relays in electrical circuits for initiating and discontinuing the flow of electrical current through such a circuit is well-known. Electro-mechanical relays have established the capability for conducting relatively large quantities of electrical current while associating with conductance of these large currents a relatively minimal penalty in the form of a voltage drop across current conductors within the relay. This relatively low voltage drop is engendered, primarily, by dint of solid, generally metallic conductor to solid, generally metallic conductor within the electro-mechanical relay while the electro-mechanical relay is configured for conducting electrical current therethrough.

Electro-mechanical relays, historically, have been subject to damage as a result of arcing of electrical current between current conductors within the relay as the conductors are separated to discontinue electrical current flow through the relay or as the conductors approach physical contact one with the other to initiate the flow of electrical current electrical through the relay. These typically metallic conductors subject to such arcing damage are frequently termed "contacts". Electro-mechanical relay contacts frequently sustain damage as a result of electrical arcing, and the damage functions typically to alter the geometry and metallic properties of the contacts, thereby introducing resistance to electrical current flow through the relay. This resistance to electrical flow can contribute to a more elevated voltage drop than would otherwise be desirable being associated with electrical current flow through the conductor and, unchecked, can result in further, progressive deterioration of the contact and eventually result in a failure of the relay by dint of excessive heat build-up associated with the passage of electrical current through the deteriorated contact(s). In voltage sensitive circuits, a significant voltage drop across an electro-mechanical relay in the circuit can adversely impact the performance of any sensitive circuitry relying upon a particular voltage being available from the relay where such available voltage is reduced by reason of elevated resistance in the relay associated with damaged contacts.

SUMMARY OF THE INVENTION

Accordingly, it is an object of the present invention to provide a means for suppressing arcing within an electro-mechanical relay during the opening or closing of the electro-mechanical relay. More particularly, it is an object of the invention to provide a means for suppressing such arcing characterized by negligible power dissipation upon closure of contacts within the electro-mechanical relay to place the relay in a full, electrically conducting mode as well as upon separation of the electro-mechanical relay contacts to place the relay in a non-conducting mode.

Accordingly, in the present invention, wherein an electrical circuit includes an electro-mechanical relay activated by a flow of electrical current through an activating coil associated with the electro-mechanical relay to close the electro-mechanical relay for the transmission from time to time of electrical current therethrough or thereacross, and wherein electrical current transferring contacts within the electro-mechanical relay are subject to damage by dint of arcing of electrical current between the contacts upon opening or closing of the contacts during operation of the electro-mechanical relay, an arc suppressing means is included in the circuit. The arc suppressing means is characterized by a solid state current transferring means bridging the electro-mechanical relay and thereby configured to carry electrical current around the relay within the circuit. The solid state switching means is activatable by effecting an alteration in an electrical signal applied to a sensing electrode of the solid state switching means.

The arc suppressing means of the circuit also includes a means for detecting a condition within the circuit enabling a flow of electrical current through the activating coil associated with the electro-mechanical relay together with a means for applying to the sensing electrode of the solid state switching means the altered electrical signal while the flow of electrical current through the activating coil pertains. A means also is provided for continuing application of the altered electrical signal to the sensing electrode of the solid state switching means for a desired period of time following a discontinuance of flow of electrical current through the activating coil associated with the electro-mechanical relay.

In the invention, the solid state switching means desirably is possessed of a resistance to the passage of electrical current therethrough sufficient whereby while the contacts of the relay are closed and conducting electrical current through the relay, electrical current flow through the solid state switching means and around thereby the relay results in negligible power dissipation.

The above and other features and advantages of the invention will become more apparent when considered in light of a detailed description of the invention together with the drawing which follow together forming a part of the specification.

BEST EMBODIMENT OF THE INVENTION

Figure 1:
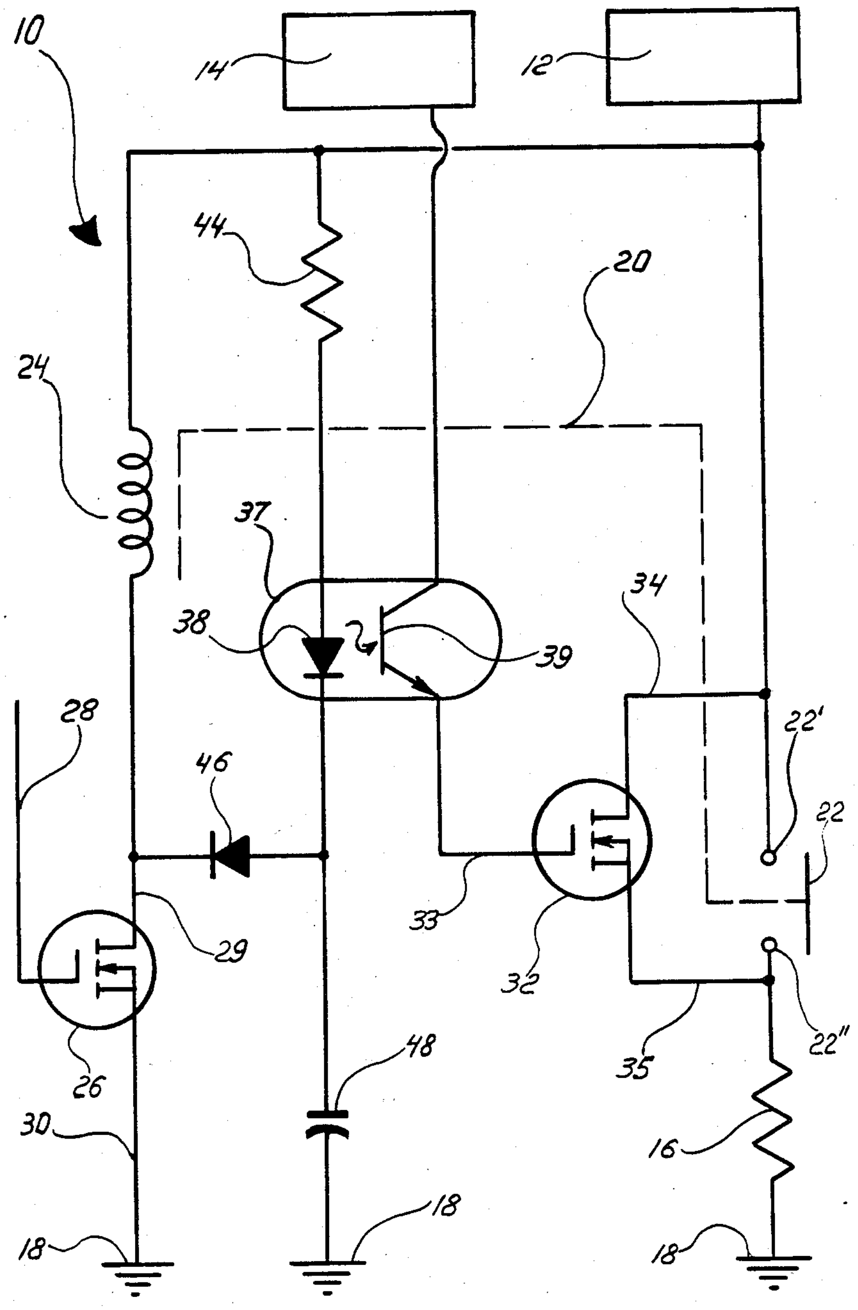
FIG. 1 is a circuit schematic of an electrical circuit including an embodiment of the invention.

Referring to the drawing, FIG. 1 depicts an electrical circuit 10. The electrical circuit includes a source of direct current (DC) power 12 and a source of elevated DC power 14. By a source of elevated DC power 14 what is meant is a DC power source supplying a DC power voltage in excess of the voltage available at the source of DC power 12. The extent of the excess of the DC power voltage supplied by the source of DC power 14 is primarily dependent upon the voltage requirements of the particular configuration of components within the electrical circuit 10 in order to enable operation of the electrical circuit 10.

The electrical circuit 10 is configured for the application of an electrical current from the source of DC power 12 through a load 16, typically having an electrical resistance associated therewith, to a point of low reference voltage 18 within the circuit, that is, a path for the return of electrical current to the source of DC power 12.

It should be understood that the load 16, while depicted in FIG. 1 as a resistor, can be any combination of electrical or electronic components configured to consume power available from the source of DC power 12 for purposes of performing a useful function or useful for work. By the term electrical component what is meant is electrically operated equipment; by the term electronic component what is meant is devices in which conduction is principally accomplished by electrons moving through a vacuum, gas, or semiconductor.

In the circuit depicted in FIG. 1, the load 16 is contemplated as being an electrothermal de-icer or anti-icer positioned typically on or straddling a leading edge of an aircraft component for purposes of either de-icing the aircraft component or prevent the accumulation of ice upon the component. Such de-icers or anti-icers are well-known in the art of aircraft ice protection engineering and typically comprise electrical resistance elements in the form of metallic wires or ribbons embedded between plies of a supportive material, typically coated fabric and rubber, to define a structure typically laminatably applied to surfaces such as a leading edge of aircraft. Such a de-icing element is shown and described in U.S. Pat. No. 4,386,749 the specification of which is incorporated herein as if fully set forth herein.

The circuit 10 includes an electro-mechanical relay 20 having a moveable contact 22 configured to bridge between stationary contacts 22', 22'' to establish a flow of current from the source of DC power 12 to the point of low reference voltage 18 through the load 16 and the electro-mechanical relay 20. An electro-mechanical relay coil 24 is associated with the electro-mechanical relay configured upon application of electrical current through the relay coil to draw the moveable relay contact 22 into intimate contact with the stationary relay contacts 22', 22'' to establish a flow of electrical current through the electro-mechanical relay contacts 22, 22', 22''. The act of drawing the moveable relay contact 22 into intimate physical contact with the stationary contacts 22', 22'' is conventionally known as closing the relay.

Conversely, the elimination of electrical current flow through the relay coil 24 functions to release the relay moveable contact 22 from intimate physical contact with the stationary contacts of 22', 22''. Typically the moveable relay contact 22 is spring or otherwise biased to become physically distanced from the stationary relay contacts 22', 22'' rapidly upon discontinuance of the flow of electrical current through the relay coil 24. This distancing of the moveable relay contact 22 from the stationary contacts 22', 22'' is known conventionally as opening the relay.

A solid state switch 26 is provided within the circuit 10. The switch 26 is configured to permit a flow electrical current between the source of DC power 12 and the point of low reference voltage 18 through the relay coil 24, closing the relay 20 by dint of movement of the moveable relay contact 22 into contact with the stationary contacts 22', 22'' to establish a flow of electrical current through the relay 20. In the embodiment of FIG. 1 it should be apparent that power to the relay coil 24 could be applied employing the switch 26 from a source other than the source of DC power 12. Equally, the switch 26 could be of any suitable or conventional nature including manual or electro-mechanical switches. Accordingly, the switch 26 is thereby configured to control electrical current flow through the load 16 to the point of low reference voltage 18.

In the embodiment of the invention shown in FIG. 1, the switch 26 is a solid state device having a sensing electrode 28 and a pair of conducting electrodes 29, 30. The conducting electrodes 29, 30 are configured to conduct electricity through the switch 26 to the point of low reference voltage thereby establishing a current pathway through the relay coil 24 from the source DC power 12 to activate the relay 20 by closing the moveable relay contact 22 against the stationary contacts 22', 22''. The sensing electrode 28 is configured to receive an electrical signal. Receipt of an electrical signal at the sensing electrode 28 typically causes the solid state switch 26 to establish electrical current flow through the solid state switch 26 employing the electrodes 29, 30.

A second solid state switching means or shunt 32 is provided having a sensing electrode 33 and current conducting electrodes 34, 35. The current conducting electrodes 34, 35 are positioned within the circuit whereby, with respect to a direction of current flow through the relay to the point of low reference voltage 18, the electrode 34 is connected to the circuit 10 prior to the relay 20 and the electrode 35 is connected to the circuit 10 subsequent to the relay 20. When the solid state switching shunt 32 is activated, electrical current can flow through the electrodes 34, 35 to bypass the relay 20 and establish a current flow from the source of DC power 12 through the load 16 to the point of low reference voltage 18. The sensing electrode 33 of the solid state switching means or shunt 32 is configured to respond to an electrical signal which signal is appropriate to the particular embodiment, that is, the electrical condition of the signal is capable of being changed to either enable or inhibit the passage of electrical current through the electrodes 34, 35 of the solid state switching means 32, typically between a 0 volts, 0 ampere condition and another voltage/amperage condition.

Typically the solid state switching means or shunt 32 is a suitable or conventional current conducting solid state device configured to be activated upon receipt of an altered electrical signal at a sensing electrode and to apply a current through the switching means or shunt 32 by the electrodes 34, 35. Preferably the switching means or shunt 32 is an FET transistor.

A means 37 is provided in the circuit 10 of FIG. 1 for detecting the onset of a flow of electrical current through the coil 24 by activation concurrently therewith and is configured for altering an electrical signal applyied to the sensing electrode 33 while electrical current flows through the relay coil 24, that is an electrical signal altered from the electrical signal, if any, applied to the sensing electrode 33 while electrical current is not being applied to the relay coil 24. In preferred embodiments, this means 37 is a so-called optical coupler. Suitable optical couplers for practicing the invention are readily commercially available.

Also known as optoisolators, optical isolators, optically coupled isolators, optocouplers, optoelectronic isolators, photocouplers, or photoisolators, these optical couplers are characterized by a light emitting diode (LED) energized by electrical current passed through the LED, optically coupled to a light sensitive output diode, transistor, silicone controlled rectifier or other photo detector.

An optical coupler such as the means 37 in FIG. 1 responds to a flow of electrical current through the LED 38 to provide an optical signal which activates an opto detector 39 to provide an electrical signal altered from the electrical signal, if any, provided by the optical coupler while electrical current is not flowing through the relay coil 24 and LED. In the embodiment of FIG. 1, the switching means 32 requires an electrical potential sensed at the electrode 33 of a greater voltage than that available from the source of DC power 12 as provided to the electrode 34 in the circuit 10. Accordingly, a source of elevated DC power 14 is made available to the optical coupler 37 enabling the optical coupler 37 to, in conjunction with an electrical current flow through the relay coil 24, apply an elevated voltage to the sensing electrode 33 in excess of that available at the electrode 34 from the source of DC power 12.

A resistor 44 is provided to protect the optical coupler 37 against excess current flow. It should be apparent that while electrical current flows through the relay coil 24 as enabled by activation of the switch 26, such activation will also cause a current flow through the resistor 44, the LED of the optical coupler 37, and then through the diode 46. When the solid state switch 26 is opened, electrical flow is also discontinued through the diode 46 to the point of low reference voltage 18.

It is desirable that the shunt or solid state switching means 32 be activated for a time period extending beyond the point in time at which electrical current flow through the relay coil 24 is terminated. Continuing electrical current flow through the shunt 32 facilitates an elimination of arcing as the moveable relay contact 22 disengages from the stationary contacts 22', 22'' as the relay coil 24 ceases to be energized.

Accordingly, a capacitor 48 is provided which enables continued electrical current flow through the resistor 44 and the optical coupler 37 to charge the capacitor 48 after termination of electrical current flow through the diode 46 and the solid state switch 26 as the solid state switch 26 opens to terminate electrical current flow through the relay coil 24. The capacitor 48 is sized to require a charge time sufficient to maintain electrical current flow through the LED portion of the optical coupler 37 and therefore to maintain the desired altered electrical signal at the sensing electrode 33 for a time period sufficient to assure that the moveable relay contact 22 has sufficiently disengaged from the stationary contacts to 22', 22'' to assure a minimization or hopefully a total elimination of arcing associated with such disengagement. As the capacitor 48 becomes fully charged, electrical current flow through the optical coupler 37 drops to an extent where the desired altered electrical signal is no longer made available by the optical coupler 37 to the sensing electrode 33 of the switching means or shunt 32 and electrical conductance through the shunt 32 is thereby terminated.

It should be apparent, in operation of the circuit 10 shown and described in FIG. 1, that the switching means or shunt 32 also provides a fail-safe backup function to the mechanical relay 20. In the event that the relay coil 24 becomes defective or the mechanical relay, for any reason, fails to close upon activation of the relay coil 24, while the switch 26 is activated enabling the flow of electrical current therethrough, electrical current will flow through the resistor 44, the optical coupler 37, and the diode 46 to provide the desired altered electrical signal at the sensing electrode 33 of the shunt 32 and thereby engage the shunt to provide an electrical flow through the load 16.

The switching means 32 is provided to be possessed of a resistance to the flow of electrical current therethrough in a quantity sufficient to activate the load 16 whereby, while the relay contacts 22, 22', 22'' are engaged, a sufficiently low value of electrical current flows through the switching means 32 via the electrodes 34, 35 to assure that a negligible power dissipation occurs from within the switch as a result of the switching means 32 being present in the circuit 10. By negligible power dissipation, what is meant is that the switching means 32 does not require protection by a heat dissipating device such as a heat sink. Heat protection is typically not required when a temperature rise associated with operation of the shunt 32 over an extended time period does not exceed about 20° C. in excess of a temperature associated with the circuit 10 while no current flows therethrough. More typically this limiting temperature rise is associated with 8° C. maximum.

In use, DC power is supplied from the source of DC power 12 and elevated DC power is supplied from the source of elevated DC power 14. The switch 26 is closed by application of an electrical signal to the electrode 28 to initiate electrical current flow through the relay coil 24 coincidentally with electrical current flow through the resistor 44, the LED portion of the optical coupler 37, and the diode 46. Electrical current flow through the relay coil 24 activates the electro-mechanical relay 20 by closing the contacts 22, 22', 22''; however before the moveable relay contact 22 can close, a result of the time delay inherent in such a mechanical closing function, the solid state switching means 32 initiates current flow around the electro-mechanical 20 to an extent sufficient whereby, as the moveable relay contact 22 closes against the stationary contacts 22', 22'', arcing is substantially minimized or eliminated between such contacts.

Once the relay contacts 22, 22', 22'' close, by dint of a resistance associated with the passage of electrical current through the solid state switching means 32, the preponderance of the electrical current flowing from the source of DC power 12 through the load 16 passes through the relay 20 and not the shunt 32. Accordingly, the solid state shunt 32 itself does not dissipate meaningful quantities of power. As the switch 26 disengages, and the moveable relay contact 22 begins to disengage from the stationary contacts 22', 22'', the capacitor 48 functions to hold the optical coupler 37 in the circuit by continuing the flow of electrical current through the LED portion thereof for sufficient time to provide the desired altered electrical signal to the sensing electrode 33 of the shunt 32 and thereby hold the shunt 32 in the circuit sufficiently long to conduct electrical current around the electro-mechanical 20, and substantially reduce or eliminate arcing as the contacts 22, 22', 22'' separate.

While a preferred embodiment of the invention has been shown and described in detail, it should be apparent that various modifications may be made thereto without departing from the scope of the claims that follow.

What is claimed is:

1. In an electrical circuit having an electro-mechanical relay activated by a flow of electrical current through an activating coil to close the electro-mechanical relay for the transmission from time to time of electrical current thereacross, and wherein electrical current carrying contacts within the electro-mechanical relay are subject to damage by dint of arcing of electrical current between the contacts upon opening or closing of the contacts during operation of the electro-mechanical relay, a means for suppressing the arcing comprising:

a solid state switching means configured to bridge the relay to carry electrical current around the relay within the circuit, the solid state current conducting means being activatible by an application of a desired electrical signal to a sensing electrode thereof:

means for detecting a condition within the circuit enabling a flow of electrical current through the activating coil together with means for applying to the sensing electrode of the solid state means the desired electrical signal throughout the duration of said condition;

means for continuing application of the desired electrical signal to the sensing electrode for a desired period of time following a discontinuance of the flow of electrical current through the activating coil.

2. The means of claim 1, the solid state switching means being possessed of a resistance to the passage of electrical current therethrough sufficient whereby while the contacts of the electro-mechanical relay are closed and conducting electrical current through the electro-mechanical relay, electrical current flow through the solid state switching means results in negligible power dissipation.

3. The circuit of claim 1, the solid state switching means being a transistor device, the detecting means and the means for applying a signal being an optical coupling device, the means for continuing application of the altered signal being a capacitor and the circuit including a source of voltage connected to a photo detector of the optical coupling device sufficient to activate the solid state switching means.

4. In an electrical circuit having an electro-mechanical relay activated by a flow of electrical current through an activating coil to close the electro-mechanical relay for the transmission from time to time of electrical current thereacross, and wherein an electrical current conveying contact within the electro-mechanical relay are subject to damage by dint of arcing of electrical current between the contacts upon opening or closing of the contacts during operation of the electro-mechanical relay, a means for suppressing the arcing comprising:

a switching transistor configured to bridge the electro-mechanical relay to carry electrical current around the electro-mechanical relay within the circuit, the switching transistor being activatible by the application of a desired electrical signal to a sensing electrode thereof;

an optical coupling means configured to detect a condition within the circuit enabling a flow of electrical current through the activating coil, the optical coupling means being configured to apply to the sensing electrode of the switching transistor the desired electrical signal throughout the duration of said condition;

a capacitor positioned and configured within the circuit to continue application of the desired electrical signal to the sensing electrode for a desired time period following a discontinuance of the flow of the electrical current through the activating coil.

5. In the means of claim 4, the switching transistor being configured to possess of a resistance to the passage of electrical current therethrough sufficient whereby while the contacts of the relay are closed and conducting electrical current through the relay, electrical current flow through the switching transistor results in negligible power dissipation.

6. The device of claim 5, the switching transistor being an FET transistor.

7. The device of claim 6, the capacitor being connected between the optical coupling device and a point of low reference voltage in the circuit.

* * * * *